Aug. 1, 1933.   E. TIMBS ET AL   1,920,609
BEARING STRUCTURE
Filed July 17, 1929    2 Sheets-Sheet 2

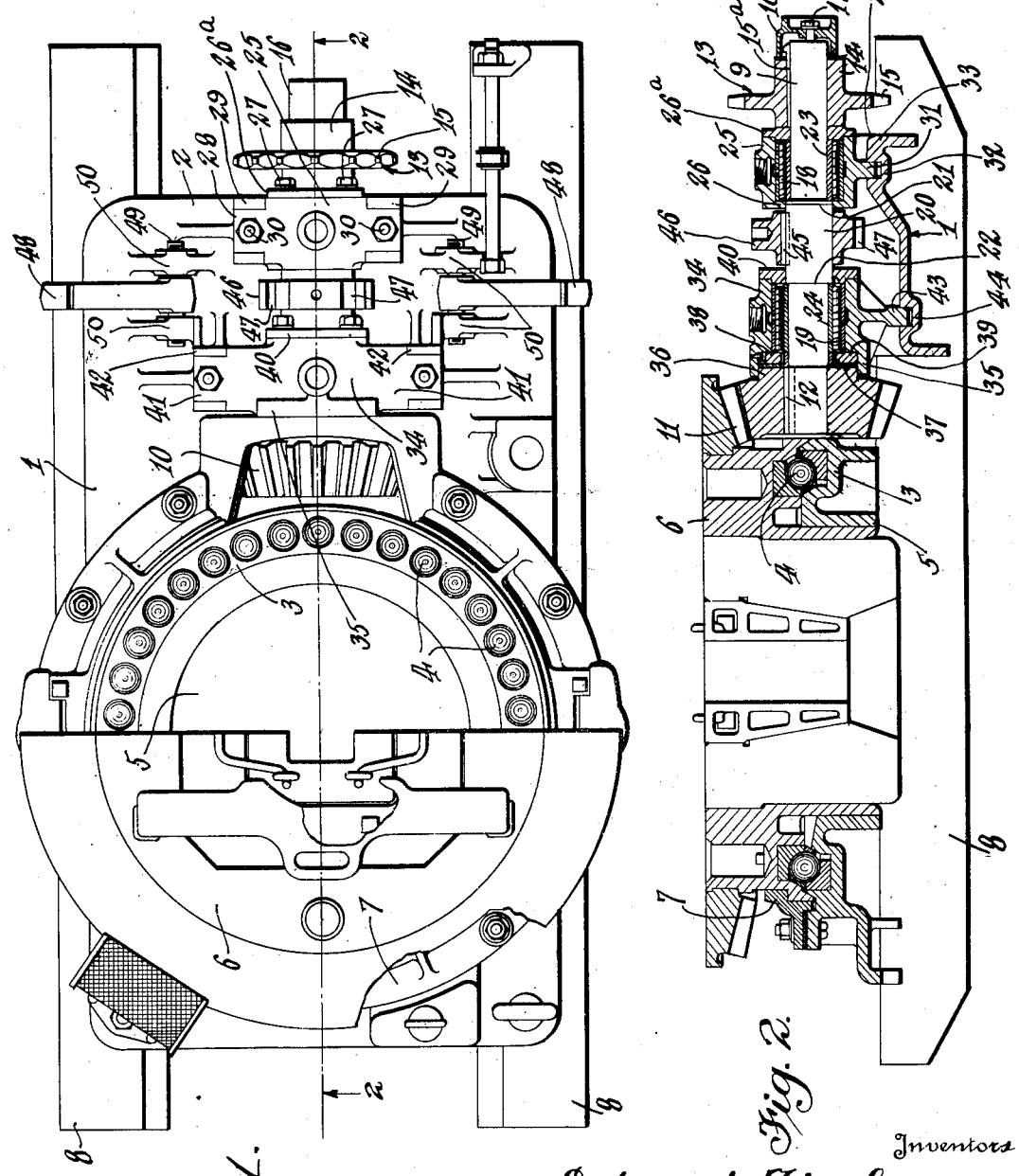

Inventors
Edward Timbs
Daniel Ward Walters
By Lyon & Lyon
Attorneys

Patented Aug. 1, 1933

1,920,609

UNITED STATES PATENT OFFICE

1,920,609

BEARING STRUCTURE

Edward Timbs and Daniel Ward Walters, Los Angeles, Calif., assignors to The National Supply Company of Delaware, New York, N. Y., a Corporation of Delaware Application July 17, 1929. Serial No. 378,992

2 Claims. (Cl. 308—22)

This invention relates to rotary machines, and more particularly to a means of mounting a unitary assembly pinion shaft upon the base of a rotary machine in position to drive the rotary table of the rotary machine.

An object of this invention is to provide a means for mounting a unitary pinion shaft assembly upon a base of the rotary machine in position to drive the rotary table of the rotary machine through the unitary pinion shaft assembly.

Another object of this invention is to provide a unitary pinion shaft assembly for rotary machines including a pinion shaft carrying at one end the rotary table drive pinion and at its opposite end an overhanging sprocket and a pair of spaced bearings interposed between the pinion and overhanging sprocket and housings for said bearings removably secured to the base of the rotary machine in a manner to provide a unitary assembly pinion shaft structure.

Other objects and advantages of this invention it is believed will be apparent from the following detailed description of a preferred embodiment thereof as illustrated in the accompanying drawings.

In the drawings:

Figure 1 is a top plan view of a rotary machine embodying this invention illustrating the rotary table and bushing assembly as cut away on the medial line to illustrate the structure of the base of the rotary machine.

Figure 2 is a sectional elevation taken substantially on the line 2—2 of Figure 1.

Figure 3:
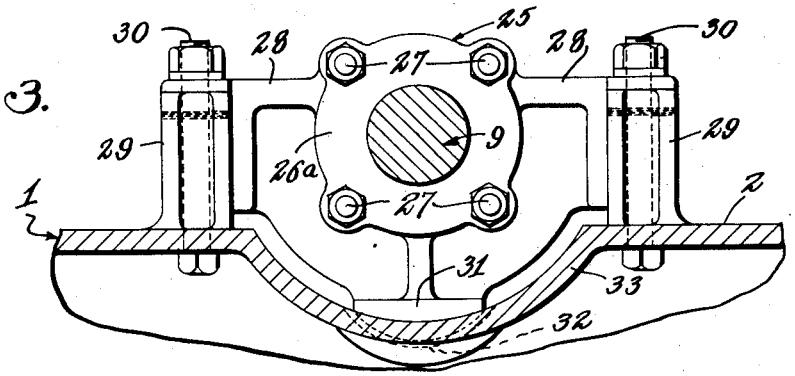
Figure 3 is an end elevation of the rotary machine as illustrated in Figure 2 illustrating the pinion shaft as broken away and the overhanging sprocket removed.

In the preferred embodiment of this invention illustrated in the accompanying drawings, 1 indicates the base of a rotary machine which is of one-piece construction and includes an outwardly extending base portion 2 and providing a bearing race 3 in which bearing members 4 are supported. The base 1 also provides a centrally disposed opening 5 in which the rotary table 6 is positioned. The rotary table 6 is rotatably supported upon the bearings 4. A hold-down bracket 7 of any suitable or desirable construction as is well understood in the art is provided for holding the rotary table 6 down upon the bearings 4. The base 1 is supported on skids 8 in a manner well understood in the art.

The unitary pinion shaft assembly embodying our present invention includes a shaft 9 which at its inner end carries the drive pinion 10 in position to mesh with the gear teeth 11 formed on the under face or carried by the rotary table 6. The beveled pinion 10 is keyed to the shaft 9 as illustrated at 12. Mounted upon the shaft 9 at its opposite end is a sprocket 13 which overhangs the end of the portion 2 of the base 1. The sprocket 13 is formed in off center position on its hub 14 so that by reversing the said sprocket 13 end for end, the position of its gear teeth 15 may be varied in order to permit aligning of the sprocket 13 with its drive means such as the rotary drive sprocket of a rotary drawworks or the like. The overhanging sprocket 13 is secured to the shaft 9 by means of a key 15a. A cap 16 is provided which encloses the end of the shaft 9 and is held in position by means of a stud bolt 17 screw-threaded in the end of the shaft 9.

Interposed between the beveled pinion 10 and the overhanging sprocket 13 are roller bearings 18 and 19. The shaft 9 is formed intermediate its ends with a portion of enlarged diameter 20 providing shoulders 21 and 22 against which the ends of the rings 23 and 24 of the roller bearing structures 18 and 19 engage to prevent longitudinal displacement of the bearings 18 and 19 toward each other.

In order to hold the bearing 18 properly positioned upon the shaft 9 at its opposed end, a bearing housing 25 is provided which is formed to completely enclose the bearing 18 being provided with an inwardly extending annular flange 26 at end and provided with a cover plate 26a at its opposite end, which cover plate 26a is adapted to be secured to the housing 25 by means of stud bolts 27. The shaft 9 extends centrally through the plate 26a. The housing 25 is provided with laterally extending arms 28 which fit within brackets 29. The brackets 29 are preferably cast integral with the outwardly extending portion 2 of the one-piece base 1. The arms 28 are held in position by means of bolts 30. The housing 25 is held from longitudinal displacement along the shaft 9 by the arms 28 fitting within recesses formed in the upper faces of the brackets 29.

In order to support the housing 25 and prevent lateral displacement of the housing 25 along the shaft 9, the housing 25 is formed with a downward extension 31 which fits within a recess 32 formed in the upwardly extending portion 33 of the portion 2 of the base 1.

A housing 34 provided for enclosing the bearing 19 is of substantially the same construction as the housing 25 except that the housing 34 is at its inward end provided with a longitudinally extending cylindrical flange 35 which fits over the cylindrical portion 36 of the beveled pinion 10 and encloses an end thrust bearing washer 37 which is positioned between the end face of the beveled pinion 10 and a bearing plate 38 housed within the cylindrical flange 35 and engaging the end face 39 of the housing 34. The housing 34 is at its opposite end provided with a closing cap 40 which is secured to the housing 34 in the same manner as the end plate 26a is secured to the housing 25. The housing 34 is secured against end-wise motion by means of arms 41 which fit within brackets 42 formed integral with the base portion 2 in the same manner as the housing 25 is held against longitudinal displacement. The housing 34 is also provided with a downward extension 43 which fits within a recess 44 formed in the extension 2 of the base 1.

Means are provided for locking the pinion shaft 9 to hold the rotary table 6 from rotation in either direction, which means are preferably of the following construction:

Mounted on the shaft 9 between the housings 25 and 34 and keyed thereto, as indicated at 45, is a lock ring 46. The lock ring 46 is provided around its periphery with a plurality of detents 47 into which locking pawls 48 are adapted to fit. The locking pawls 48 are pivotally mounted on pins 49 which pass through and are secured to standards 50 preferably cast integral with the longitudinal extending portion 2 of the base 1.

Figure 4:
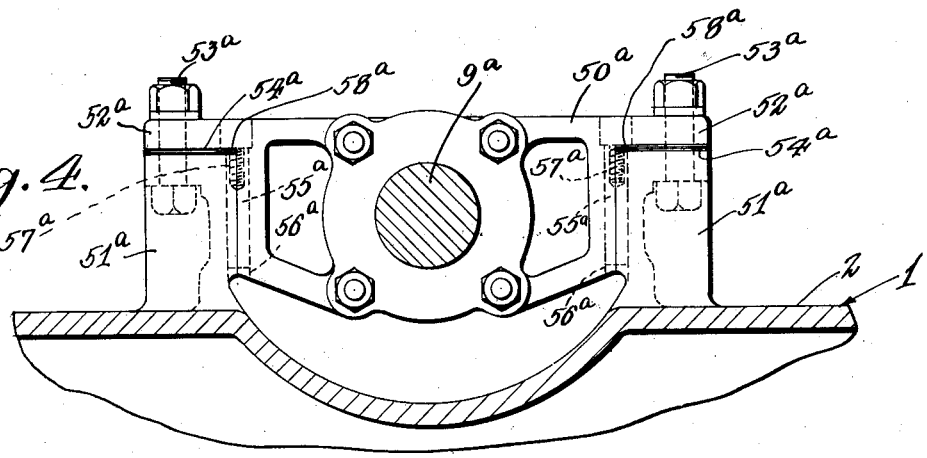
Figure 4 is a similar end elevation of a modified form of rotary machine embodying this invention.
Figure 5:
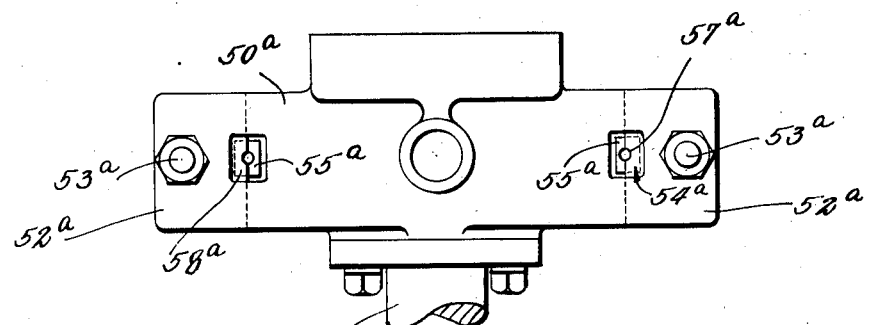
Figure 5 is a fragmental top plan view of the structure illustrated in Figure 4.

In the modified form of this invention illustrated in Figures 4 and 5, a pair of spaced bearing housings are provided for the pinion shaft 9a and the supporting bearings thereof for a rotary machine in a manner similar to that disclosed by Figures 1, 2 and 3 of this application. In Figures 4 and 5 only one of such bearing housings are disclosed and that is the bearing housing corresponding to the bearing housing 34 of the machine disclosed in Figures 1 to 3 inclusive. A second spaced bearing housing similar in construction to the bearing housing 25 is also provided spaced on the pinion shaft as in the case of the first modification of this invention. In this modification of the invention the two bearing housings are substantially of the same form and are spaced along the shaft 9a of the rotary machine to enclose the bearings 18 and 19. Each bearing housing includes a form of a casting substantially cylindrical in form and of substantially the same internal construction as the bearing housings 25 and 34 and differs from the bearing housings 25 and 34 only in the form of bridge construction 50a by means of which the bearing housings are secured in position to the outwardly extending portion 2 of the base 1.

The bridge construction includes an outwardly extending web casting which fits closely between a pair of upstanding standards 51a formed on the outwardly extending portion 2 of the base 1. The bridge construction 50a is thus, by means of the standards, centralized axially between the standards 51a so that the pinion shaft 9a will be accurately radially located in relation to the rotary table 6 of the rotary machine.

In order to locate the shaft 9a in a correct horizontal plane, and to hold the same in correct position, caps 52a are provided for the standard 51a and are secured to the standard 51a by means of bolts 53a. The vertical position of the caps 52a is adjusted and determined by means of shims 54a interposed between the upper surface of the standards 51a and the caps 52a. The caps 52a are formed integral with the bridge 50a and the placing of shims 54a in position determines the vertical position of the shaft 9a.

In order to hold the housings, and consequently the shaft 9a and the pinion carried thereby, away from the rotary table 6, keys 55a are provided which fit in keyways 56a formed between the bridge 50a and standards 51a. The keys 55a are tapped as indicated at 57a to receive a bolt or other threaded instrument to permit the withdrawal of the keys when it is desired to remove the unitary pinion assembly provided.

The inner ends 58a of the shims 54a fit over the top of the keys 55a holding the keys 55a in position.

Having fully described our invention, it is to be understood that we do not wish to be limited to the details herein set forth, but our invention is of the full scope of the appended claims.

We claim:

1. In a bearing structure, the combination of a one-piece self-contained bearing housing having laterally extending arms and a depending arm formed integrally therewith, a supporting base having two spaced standards extending upwardly from said base beyond the horizontal center line of said housing, means on said base to engage the depending arm to restrain the housing from any axial movement, and means passing vertically through the laterally extending arms and the standards of said base to hold the housing to said base.

2. In a bearing mounting, the combination of a one-piece self-contained bearing housing having laterally extending arms, each having an inverted L-shaped recess providing horizontal and vertical surfaces, a supporting base having two spaced standards extending upwardly from said base beyond the horizontal center line of said housing, said standards having complementary horizontal and vertical surfaces fitting within the L-shaped recesses of the housing, adjusting means between the horizontal surfaces of the housing and standards, means fitting between the vertical surfaces of the housing and base to hold the housing against vertical movement, and means passing vertically through the laterally extending arms and the standards of said base to hold the housing to said base.

EDWARD TIMBS.
DANIEL WARD WALTERS.